(12) United States Patent
Guillemette et al.

(10) Patent No.: US 9,919,467 B2
(45) Date of Patent: Mar. 20, 2018

(54) EXTRUDABLE POLYMER COMPOSITES WITH MEMBRANE BARRIER PROPERTIES

(71) Applicant: Guill Tool & Engineering Co., Inc, West Warwick, RI (US)

(72) Inventors: Richard Guillemette, West Warwick, RI (US); Robert Peters, West Warwick, RI (US); Christopher Hummel, Providence, RI (US)

(73) Assignee: Guill Tool & Engineering Co., Inc., West Warwick, RI (US)

( * ) Notice: Subject to any disclaimer, the term of this patent is extended or adjusted under 35 U.S.C. 154(b) by 955 days.

(21) Appl. No.: 14/244,843

(22) Filed: Apr. 3, 2014

(65) Prior Publication Data
US 2014/0308506 A1  Oct. 16, 2014

Related U.S. Application Data

(60) Provisional application No. 61/807,888, filed on Apr. 3, 2013.

(51) Int. Cl.
| | | |
|---|---|---|
| B29C 47/06 | (2006.01) | |
| B29C 47/00 | (2006.01) | |
| B29C 47/70 | (2006.01) | |
| B29C 47/26 | (2006.01) | |

(52) U.S. Cl.
CPC ........ B29C 47/065 (2013.01); B29C 47/0023 (2013.01); B29C 47/0057 (2013.01); B29C 47/0059 (2013.01); B29C 47/266 (2013.01); B29C 47/707 (2013.01); B29C 47/26 (2013.01); *Y10T 428/249921* (2015.04); *Y10T 428/2929* (2015.01)

(58) Field of Classification Search
CPC .............. B29C 47/066; B29C 47/0023; B29C 47/0057; B29C 47/26; B29C 47/707; B29C 47/266; Y10T 428/2929; Y10T 428/249921
See application file for complete search history.

(56) References Cited

U.S. PATENT DOCUMENTS

| | | | | |
|---|---|---|---|---|
| 6,528,155 B1 * | 3/2003 | Kong | ...................... | B32B 27/20 |
| | | | | 264/173.15 |
| 6,936,203 B2 * | 8/2005 | Reilly | ................. | B29C 47/0023 |
| | | | | 264/176.1 |
| 2012/0237746 A1 * | 9/2012 | O'Donnell | ................ | B32B 7/02 |
| | | | | 428/216 |

* cited by examiner

*Primary Examiner* — Michael C Miggins
(74) *Attorney, Agent, or Firm* — Ziegler IP Law Group, LLC

(57) ABSTRACT

The present disclosure generally relates to extrusion die systems. In particular, the present disclosure relates to the cyclical extrusion of materials to generate small sized grain features, generally in the range of nanosized grain features, in a tubular or profile shape, in which the individual nanolayers possess pores and/or polymer crystals oriented parallel to the extrusion flow direction and including products with enhanced permeation properties.

12 Claims, 8 Drawing Sheets

EXTRUDABLE POLYMER COMPOSITES WITH MEMBRANE BARRIER PROPERTIES

FIELD

The present disclosure generally relates to extrusion die systems. In particular, the present disclosure relates to the cyclical extrusion of materials to generate small sized grain features, generally in the range of nanosized grain features, in a tubular or profile shape, in which the individual nanolayers possess polymer crystals oriented parallel to the extrusion flow direction and including products with enhanced permeation properties.

BACKGROUND

Nanostructured materials are generally regarded as materials having very small grain feature size, typically in the range of approximately 1-100 nanometers ($10^{-9}$ meters). Metals, ceramics, polymeric and composite materials may be processed in a variety of ways to form nanosized features. These materials have the potential for wide ranging applications, including for example, industrial, biomedical and electronic applications. As a result, a great deal of study is ongoing to gain a better understanding of the characteristics of these materials.

Conventional extrusion formed products are limited to approximately twelve layers. Micro-layer extrusion processes can extend these limitations. Micro-layer extrusion processes that provide methods for obtaining small grain features are described in U.S. Pat. No. 7,690,908, (hereinafter the "'908 patent") and U.S. Patent Publication 2012/0189789 (hereinafter the "'789 Publication") both of which are commonly owned by the assignee of the instant application, the disclosures of which are incorporated herein by reference in their entirety. Further examples of extrusion technology are described in U.S. Pat. Nos. 6,669,458, 6,533,565 and 6,945,764, also commonly owned by the assignee of the instant application.

The typical micro-layer product is formed in a sheet. If a tubular product is desired, the microlayer is first formed into a sheet and then made into the tube. This creates a weld line or separation between the microlayers. The '908 patent describes a cyclical extrusion of materials by dividing, overlapping and laminating layers of flowing material, multiplying the flow and further dividing, overlapping and laminating the material flow to generate small grain features and improve properties of the formed product. Examples of the improved properties include, but are not limited to burst strength, tensile strength, tear resistance, barrier and optical properties. The '789 Publication describes extruding a flow of extrusion material in a non-rotating extrusion assembly, forming a first set of multiple laminated flow streams from the extruded flow, amplifying a number of the laminations by repeatedly compressing, dividing and overlapping the multiple laminated flow streams, rejoining the parallel amplified laminated flows, forming a first combined laminate output with nano-sized features from the rejoining; and forming a tubular shaped micro-layer product from the combined laminate output. Such products do not contain a so-called weld line, rather the weld is staggered and integrated into interdigitating layers of the laminate.

Recent reports state that extruded polymer may also form crystal lamellae when the polymeric layer is reduced to a micro or nano dimension. Such crystal lamellae have been observed to influence porosity. See for example Haopeng Wang, Jong K. Keum, Anne Hiltner, and Eric Baer; "Confined Crystallization of PEO in Nanolayered Films Impacting Structure and Oxygen Permeability;" Macromolecules, (2009) 42, 18, 7055-7066. Decreasing layer thickness to the nanometer range, however, does not always increase barrier properties. Gene Medlock and Michail Dolgovskij, (Kuraray America Inc. Pasadena, Tex.), Barrier Performance Of Nanolayer Evoh Film, Tappi Place Conference Seattle, Wash. (May 9, 2012) reported that EVOH nanolayers actually increased oxygen permeability but also increased tear strength. Polymeric processes for producing multi-layer microporous membranes with increased layer blend regions combined with extrudate stretching has produced items with variable pore size and permeation properties such as in United States Patent Publication 2011/0206973, published Aug. 25, 2011, entitled "Multi-Layer Microporous Membranes And Methods For Making And Using Such Membranes." See also Yu, T. Ph.D. Dissertation, Virginia Tech, 1996 and Johnson, M., Ph.D. Dissertation, Virginia Tech, 2000.

SUMMARY

The present inventors have extended co-extrusion technology to yield products with tens to thousands of nano-polymer layers in tubular or profile shapes, including films and sheets, wherein the extruded polymer or a component of the polymer produce lamellar crystals and/or pores aligned along the axis of extrusion. Additionally, choice of layer pore occurrence can be made both axially or equatorially depending on the layering, polymer or diluent choice.

Pores may range in size from 1-10 nm to 100 μm. Specific pore size ranges vary depending on the composition and post extrusion perturbation. Common sizes include 0.01 μm to 0.1 μm, 0.1 μm to 1 μm, 1 μm-10 μm and 10 μm to 100 μm.

The layer size required to align the crystal or pore depends on the specific polymer and/or extrusion conditions. Importantly, these crystals can change the barrier and pore properties of the material. Alignment of crystals and pores can decrease or increase permeability depending on the specific polymer and permeate. Furthermore, alternating nanolayers may contain different crystal compositions which can be further transformed through post-extrusion processes such as selective dissolution of layers with permeates. Extruded nanolayers may also be transformed through post-extrusion processes such as twisting, turning, stretching and selective dissolution to yield products with variable pore morphology. Separately extrusions can be modified by stretching. Using all of these properties one can control the permeability of the final extruded product. Applying these methods, including crystallization, bending, stretching, or twisting during the extrusion shaping stage yields products containing contiguous layers of micro- to nano-polymer layers in three dimensions and these contiguous layers may be twisted, stretched or turned to further expand the potential microlayer geometries.

One embodiment of the invention relates to multi-nanolayer sheets containing lamellar crystals aligned along the axis of extrusion. Such embodiments envision alternating the lamellar crystal sheets with layers of different lamellar crystals or polymeric layers containing different excipients such as solubilizing agents, diluents, additives, micro-particles, nano-composites, magnetic agents, fibers, and abrasives.

Polymeric nano-layer sheets forming membranes can be produced using either a wet method, which involves the use of solvents, or a dry method. In another embodiment, the dry method would be used to create a multilayered membrane.

In this method, a semi-crystalline polymer is extruded, annealed, and then stretched. The extrusion process initially orients the polymer resin through a shear rate gradient. The annealing of the fiber after extrusion functions to further align and crystallize the polymer. The stretching process creates the pores in the polymer and typically involves at least two stages. The cold stretch initialized the pores followed by a hot stretch designed to further increase pore size. The final pore sizes in the membrane depend on the polymer used, the morphology of the extruded polymer, the annealing conditions (temperature, time, extensional force, etc.), and the stretching ratios.

The multilayer technology described herein, would result in a more oriented extruded polymer before the annealing stage. This increased orientation before annealing makes it easier to create a more consistent pore size and thus membrane. The layering of polymers also increases the strength of the polymer membrane. This added strength would allow the membrane to withstand higher transmembrane pressures, which could increase permeate flux through the membrane. The stronger membrane would also allow for thinner membranes to be produced for a specific flux requirement. This would lead to saving in polymer and membrane cost.

The ability to create a membrane out of multiple materials allows for more flexibility in tailoring properties of the membrane such as diffusivity, elastic properties, crack propagation and chemical interaction. Microlayer coextrusion creates many interfaces between polymers which results in unique properties at these interfaces. Additives such as diluents can alter these polymer interfaces by creating a blend of the polymers.

Other embodiments include lamellar crystal nanolayered tubular or polygonal geometries, examples of which are shown in FIGS. 1a and 1b Examples of Tubular Annular Microlayer Geometries are illustrated in FIGS. 1c and 1d.

The geometries presented have a limited number of layers for illustrative purposes. Microlayer coextrusion can be used to create products possessing 10 to thousands of layers. The layers may contain the same or different polymer and contain different fillers, particles or chemicals. One or more of these layers contain lamellar crystals. An example with two compositions of the layers could contain composition A and composition B and the layers could alternate A-B-A-B-A-B. or even A-B-B-A-B-B-A-B-B Microlayers layers can form its own products or can be applied onto a core. Inner and outer layers can also be extruded with these layers. These products can be hollow or rod like with varying profiles, an example of which is shown in FIG. 1e The nano die may also be used to create products which will have an increased interfacial surface area (see FIGS. 1e-1h) possessing lamellae crystals that impart specialized permeability properties. Sections of the layers mentioned above may be separated by 'stems' comprised of a single material or mixture. Each stem may be made of its own respective material or mixture allowing for the properties desired in that stem. A layer, stem or combination of the two may then be removed by some process, whether it is mechanical in nature such as peeling or chemical in nature such as dissolving. If one of the materials or mixtures used in the stem along with one or more of the materials used in the layers may all be removed, the result would be a core with stems protruding from the surface. These stems would have branches (layers) attached with a large surface area exposed to the environment. In the figure above, there are alternating layers of grey and black material separated by alternating grey and black stems. Only six layers are shown in each 'stream' for illustrative purposes but may comprise of thousands of layers. If all the black material were removed, the result would be a grey core with four stems each with six branches of material characterized by crystalline lamellae. This not only greatly increases the surface area exposed to the environment but affects the porosity of the product.

In FIG. 1f the stems are tapered radially inwards. The stems may also be made to be tapered radially outwards. The stems and branches may all be made to have different thicknesses and there may be any number of each.

In FIG. 1g the core is comprised of a tube made of the grey material. Examples of a core include a solid rod, a hollow tube, a wire, or a profile all of which may either be coextruded or extruded onto and may be comprised of any materials with or without layers. The core may also be absent. An outer and/or inner layer may also be added and may be composed of multiple layers and may be comprised of any suitable material or materials.

Multiple layers of streams and stems may also be used to be able to create geometries like the one pictured in FIG. 1h. Theses layers may contain different numbers of layers, streams and stems in different orientations.

Other alignment embodiments include diamond, rhombus, pentagon, and hexagon.

Alignment embodiments also include twisted shapes such as spirals.

Another embodiment relates to products containing a hollow inner core with composite micro or nano layers extruded on the exterior.

Another embodiment relates to products containing a composite inner core extruded with composite micro or nano layers on the exterior.

Another embodiment relates to I-beam products.

Another embodiment relates to lamellar crystal products containing multiple layers of varying components.

Another embodiment of the inventions relates to products made with a multi component approach.

A multicomponent approach relies on the merger of multiple streams of materials to create a unique cross section. A stream of materials can contain any number of layers or materials. These streams can undergo multiple manipulations or mergers before being extruded as the final product. FIGS. 1e-1h are examples of the multicomponent approach.

A stream of layers for use in the multicomponent approach can be created through the use of a feedblock (FIG. 2). The black and white materials in the figure are split and layered in an alternating fashion to create the stream of layers.

A stream of materials can undergo a multiplication process similar to increase the number of layers. FIG. 3, shows a schematic of layer multiplication. The stream of layers on the left is first split into two halves which are then stacked on top of each other. After merging and compressing into the original cross section, the stream now has twice the number of layers. A process such as this is usually repeatable to create any number of layers. Other layer multiplication techniques could involve folding or wrapping a stream of layers to perform the multiplication.

FIG. 4 shows two examples of a stream being manipulated into an annular ring.

FIG. 5 depicts a merging operation in which four streams are merged together into a single stream. The streams comprised of layers could be made by feed blocks. After the four streams merge, this resulting cross section could be used to create another stream, be morphed into another geometry, or be extruded as a rod.

A product with a cross-section consisting of different sections or quadrants could be used to tailor which section of a product allows permeates through as well as to alter the direction of travel of any permeates.

An extrusion head can be designed to perform the multicomponent stream merging and manipulations with fixed capabilities as well as with a modular approach. Individual parts or subassemblies could be designed to use the same overall stream cross section as inputs and outputs. Such subassemblies could have multiple inputs and outputs depending on the manipulation being performed. Each subassembly could perform its own manipulation and through switching out subassemblies, the end result of the final product could be changed. In FIG. 5 each of the input streams could be made by their own subassembly. Three of the streams could be made by feedblocks which would output identically shaped streams. The fourth input stream comprised of a single material could come directly from an extruder.

FIG. 6 demonstrates an example process to create a square stream with an array of internal squares. The first step involves introducing a black stream and a white stream into a feedblock to create vertical layers. A black stream of material along with the stream of vertical layers could be introduced into another feedblock. The feedblock would split each stream into horizontal strips and layer them on top of each other in an alternating fashion. After the strips merge, the stream could be used to merge with other streams or be morphed into the final cross section.

FIG. 7 depicts the conversion of four streams of layers which could merge together to form a cross section with spokes radiating from the center.

With the multi-component approach of stream preparation it is possible to design for certain shapes and structures within a stream. Along with the ability to reach the micro and nano scale with layers, it is feasible to design for internal features or entire structures to also be in the micro to nano scale. Through chemically or mechanically removing some layers, these features could be released and/or exposed to the environment. Examples of such geometries are shown in FIGS. 1e-1h. A pattern such as the one seen in FIG. 6 could be used to tailor the barrier properties of products. If different materials offered different levels of barrier protection then the pattern could be used to tailor how tortuous of a path a permate will encounter.

Polymer Nanocomposites could be added to individual polymer layers. These nanocomposites can increase barrier properties by altering the diffusivity of the polymer surface, or by changing the polymer crystal orientation or type. The large aspect ratio of certain nanocomposites, such as layered silicates, can affect its barrier properties by providing a tortuous path for a permeate to travel.

Permeation of certain molecules through layers could also be increased through the introduction of nanoparticles (such as $CaCO_3$ for water vapor) or a layer thickness that results in layer breakup.

The nanolayer lamellar crystal extrusions are amenable to numerous applications including:

Packaging: The nanolayered barrier properties could be used in blow molding for packaging applications. Barrier properties may be tailored for individual packaging industry specifications. Nanolayers can be used to control the diffusivity of flavor, aroma, and solvent molecules.

Food Products: An edible or removable outer coating could be extruded onto foods to control desired barrier properties such as oxygen and moisture diffusion. An example could include extruding the casing of a sausage or meat product.

Chemical Transport/Storage: Barrier properties are very important in gas enclosed systems. A combination of polymers is required to prevent the transmission of water, alcohols, hydrocarbons, etc. Alternating layers of PA and PET can be used for barrier protection against hydrocarbons and alcohols.

Tires and other inflatable products: Increased barrier properties would allow for inflatable products to have a longer life.

Medical Use: Barrier properties are important in medical applications including water purification, removal of water vapor, reduction of oxidizing or reducing gases from contact with active agent. For example, water vapor needs to be removed from breath samples to facilitate analysis. Water vapor can also condense in sample lines and measurement cells interfering with IR carbon dioxide monitoring.

Waterproof/Breathable Clothing: Polymer fibers with a variety of barrier properties could be extruded and used to create so-called Hi-tech fabrics to be used in clothing. Such fabrics may have enhanced "wicking" and breathing properties as well as enhanced durability, stretchability, uv-resistance and water repellence.

Microporous polymer membranes are widely used as separators for batteries, particularly lithium ion batteries. The permeability of the membrane allows ions to flow between the anode and cathode. These separators are required to have excellent mechanical properties along with the permeability. The separator is also designed to include shutdown properties for stopping a battery reaction that is generating abnormal heat. The pores in the membrane will close up when the layer reaches a shutoff temperature, preventing the flow of ions.

Using a multilayer polymer separator allows the membrane to achieve more desirable properties. Layers with differing shutoff temperatures and mechanical properties can be alternated to produce membrane with increased strength and desirable shutdown properties.

Polymeric materials have been used in a broad range of separation applications. This includes microfiltration, reverse osmosis, electro dialysis, and gas separation. The properties of a polymeric membrane are determined by the property of the raw resin but also the preparation method of the microporous membrane.

Polymers of particular relevance for oxygen barrier properties include ethylene-vinyl alcohol copolymers, polyvinyl alcohol, polyvinylidene chloride, polyacrylonitrile, polyesters and polyamides.

Polymers of particular relevance for moisture barrier properties include polyethylene, polypropylene, polyvinylidene chloride, cyclic olefin copolymers, and polychlorotrifluoroethylene.

Synthetic polymers useful for preparing the barriers or membranes of the invention also include polyolefins, polyvinylidene fluoride, polytetrafluoroethylene, polyamide, polyvinyl alcohol, polyester, polyvinyl chloride, nylon, and poly(ethylene terephthalate).

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the present disclosure, and together with the general description given above and the detailed description given below, serve to explain the principles of the present disclosure. As shown throughout the drawings, like reference numerals designate like or corresponding parts.

DETAILED DESCRIPTION

Rotating small, micro and nano-layer extrusion processes are described in U.S. Pat. No. 7,690,908. Small, micro and nano layer Non-rotating extrusion processes are described in U.S. Patent Publication 2012/0189789.

Example 1

Figure 1A:
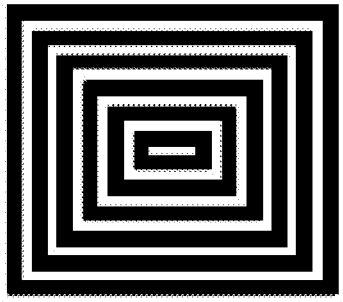
FIGS. 1-12 illustrate aspects of the disclosed embodiments.
Figure 1B:
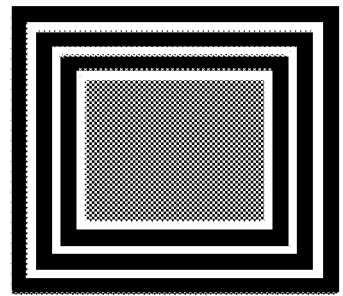
Figure 1C:
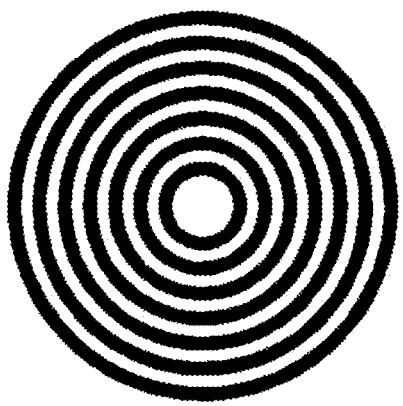
Figure 1D:
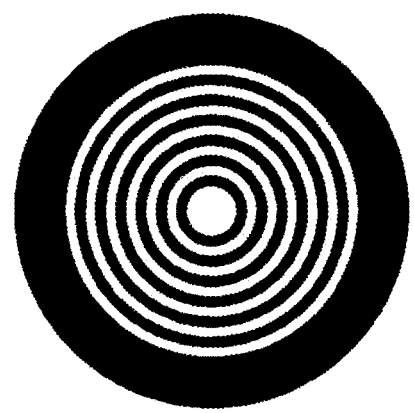
Figure 1E:
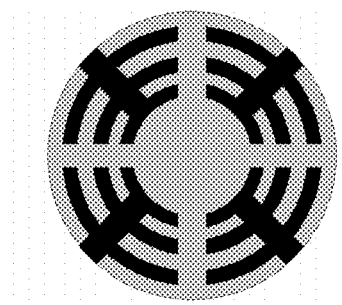
Figure 1F:
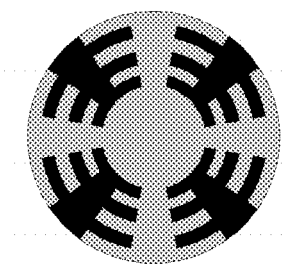
Figure 1G:
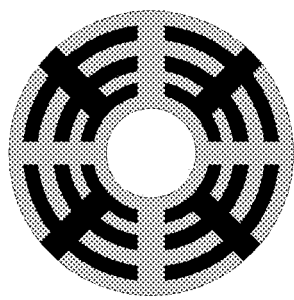
Figure 1H:
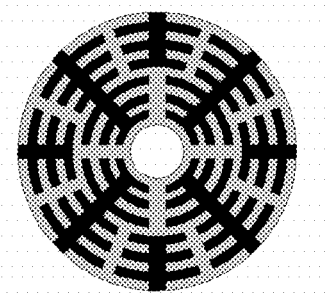
Figure 2:
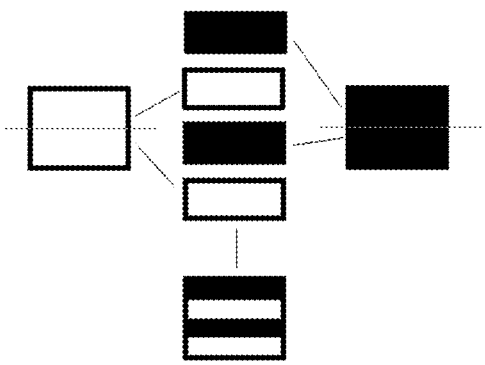
Figure 3:
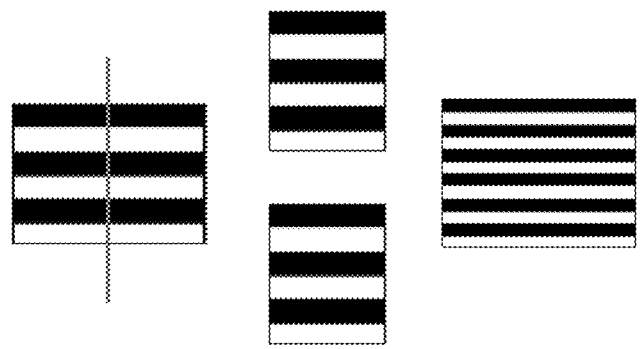
Figure 4:
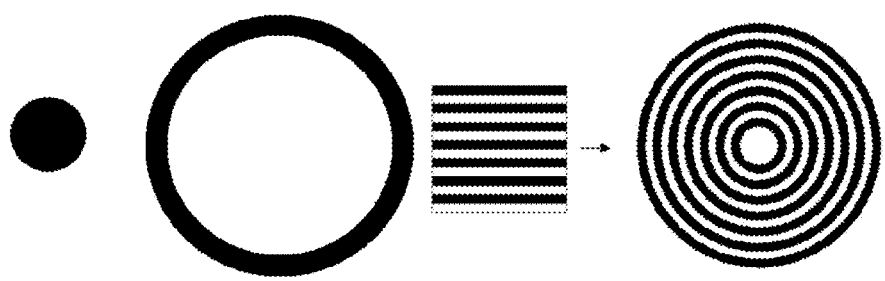
Figure 5:
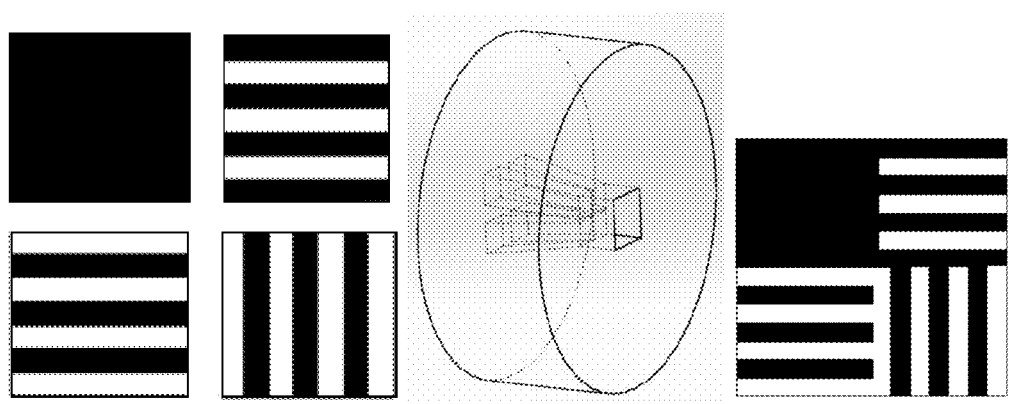
Figure 6:
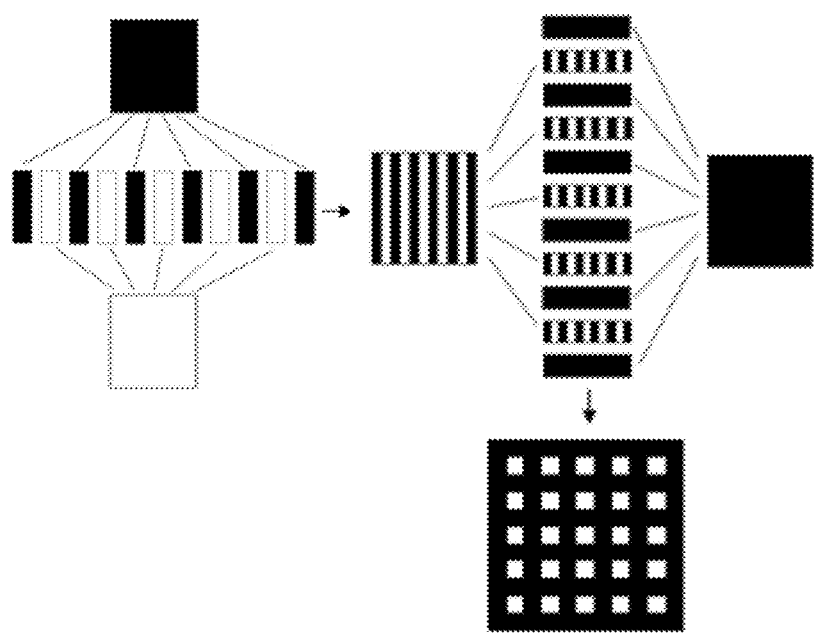
Figure 7:
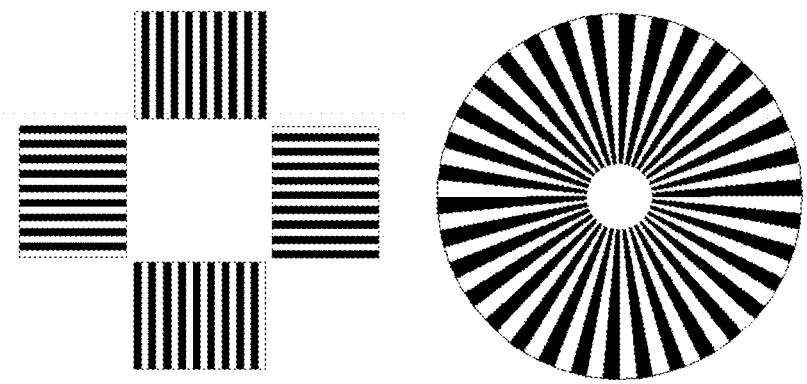
Figure 8:
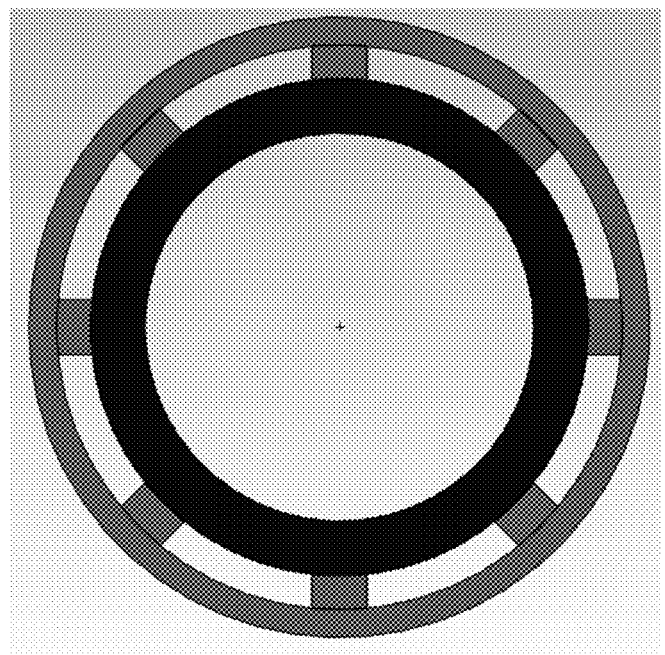
Figure 9:
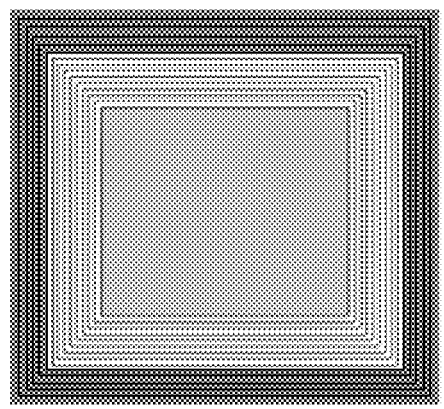

A nanolayered tube as depicted in FIG. 8 may be constructed according to the extrusion methods described above to extract materials using barrier properties. A nanolayered tube (shown as a solid black layer below) would be permeable to a certain material. The grey annular section is a microlayer barrier or a conventional layer which would be impermeable to the same material. The spokes allow a permeate to flow thru the "black" layer into the voids created by the spokes due to a concentration gradient. This device allows for the transport of a fluid and extract and contain a permeate.

The same product design could also be used to introduce a permeate to the central fluid by flowing a concentrated solution of the permeate in the voids created by the spokes. The concentration gradient would force the permeate through the black layer into the central channel.

Example 2: Beams

Multiple levels of layers containing different compositions can be extruded. Layers can be of variable size and composition with different crystalline properties and with or without a core. Such layering allows for isolation or insulation of conducting layers or optical zones.

An extruded product may also alternatively contain a hollow core. Another product entails a composite inner core extruded with composite small, micro or nano layers on the exterior. In this product, the layers may have axially oriented crystals while the center core could possess unrelated properties. This product would have outer layers for enhanced anisotropic strength similar to the product above while the inner core would provide alternate properties.

Figure 10:
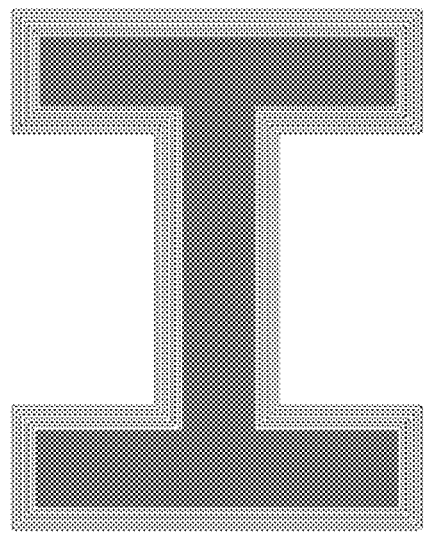

Example 3: I-Beam—See FIG. 10

The extrusion methods described herein may yield various profile configuration, including cylindrical, I-beam, C-channel, L-shaped, rectangular, square, hollow cylinder. Each of these extrusions may have differential inclusion of fillers and fibers as well as the presence or absence of core material in addition to the layers of lamellar crystal.

Figure 11:
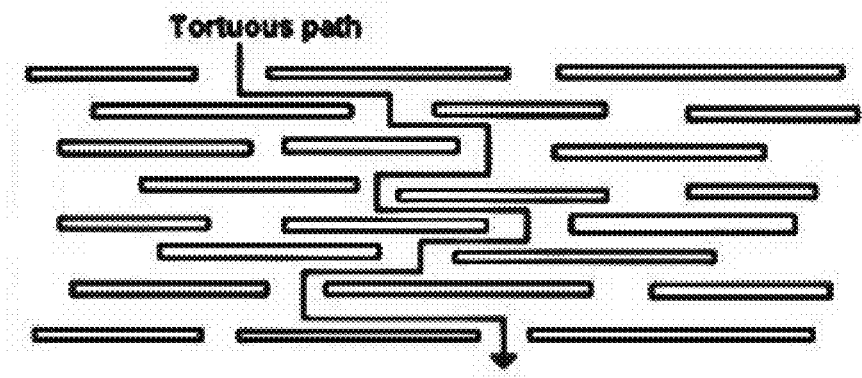

The large aspect ratio of certain nanocomposites, such as layered silicates, can affect its barrier properties by providing a tortuous path for a permeate to travel and thus can be used to increase barrier properties. The alignment of particles or crystals creates a tortuous path (see FIG. 11) for any permeate to travel. This path decreases the permeability of polymer nanocomposite.

Example 6: See FIG. 12

Figure 12:
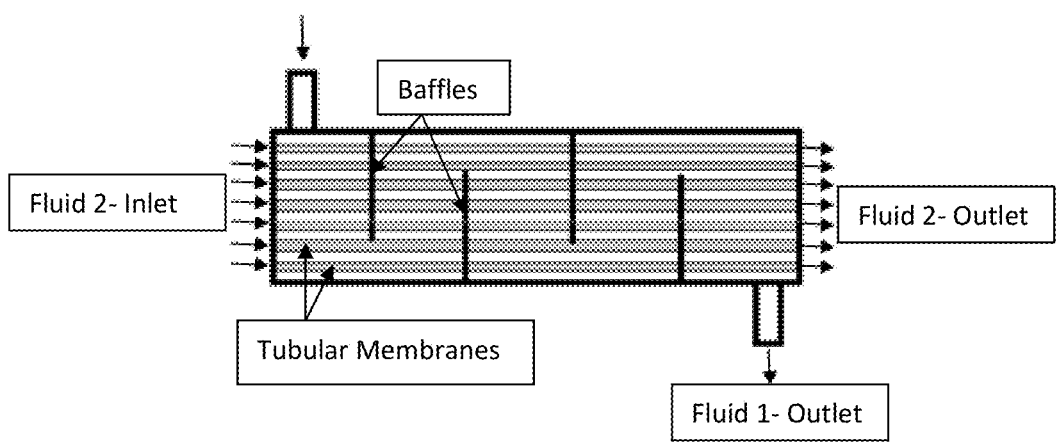

Another application with extruded tubular membranes would be a system for diffusion much like a heat exchanger. A schematic is shown in FIG. 12, above, with fluid 1 flowing through the system around a maze of baffles. Fluid 2 is running through tubular membranes which would be surrounded by fluid 2. An example application of this apparatus would be for the diffusion of oxygen into blood. In this case fluid 1 would be the blood flowing around the tubes filled with oxygen (fluid 2). The oxygen depleted blood entering the inlet would absorb oxygen diffusing through the tubular membranes and eventually leave through the outlet.

Thus, while there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An extruded product with 2-10,000 nano-polymer layers in tubular or profile shapes, wherein the extruded polymer or a component of the polymer comprise lamellar crystals and pores aligned along the axis of extrusion.

2. A product according to claim 1 wherein layer pore occurrence can be axial or equatorial.

3. A product according to claim 1 wherein the nanopolymer extrudate has been bent, stretched, or twisted after extrusion.

4. A product according to claim 1 additionally comprising solubilizing agents, diluents, additives, micro-particles, nano-composites, magnetic agents, fibers, and abrasives.

5. A product according to claim 1 wherein said extruded product is tubular and comprises a core.

6. A product according to claim 5, wherein said extruded product comprises pores that are 0.01 μm to 100 μm.

7. An extruded product with 2-10,000 nano-polymer layers in tubular or profile shapes, wherein said polymer or a component of said polymer comprise lamellar crystals aligned along the axis of extrusion and wherein nanopolymer layer sheets comprise lamellar crystals aligned along the axis of extrusion.

8. An extruded product with 2-10,000 nano-polymer layers in tubular or profile shapes, wherein said polymer or a component of said polymer comprise lamellar crystals aligned along the axis of extrusion and wherein the lamellar crystal sheets are alternated with layers of different lamellar crystals or polymeric layers containing different excipients.

9. A product according to claim 6 that purifies water.

10. A product according to claim 6 that conducts electricity.

11. A product according to claim 6 that generates electricity.

12. An extruded product with 2-10,000 micro or nano layers in tubular or profile shapes, including films and sheets, wherein the extruded polymer contains nanocomposites aligned along the axis of extrusion to enhance barrier properties.

* * * * *